United States Patent
Zhang

(10) Patent No.: US 11,648,680 B2
(45) Date of Patent: May 16, 2023

(54) PROTECTION SYSTEM AND METHOD FOR CARGO IN A COMPARTMENT AND ROBOTIC EQUIPMENT THEREOF

(71) Applicant: SHENZHEN DORABOT ROBOTICS CO., LTD., Shenzhen (CN)

(72) Inventor: Hao Zhang, Shenzhen (CN)

( * ) Notice: Subject to any disclaimer, the term of this patent is extended or adjusted under 35 U.S.C. 154(b) by 1036 days.

(21) Appl. No.: 16/343,572

(22) PCT Filed: Jul. 27, 2017

(86) PCT No.: PCT/CN2017/094666
§ 371 (c)(1),
(2) Date: Apr. 19, 2019

(87) PCT Pub. No.: WO2019/019092
PCT Pub. Date: Jan. 31, 2019

(65) Prior Publication Data
US 2020/0047347 A1    Feb. 13, 2020

(51) Int. Cl.
| | | |
|---|---|---|
| *B65D 81/05* | (2006.01) | |
| *B65B 1/20* | (2006.01) | |
| *B25J 9/16* | (2006.01) | |
| *B65G 69/00* | (2006.01) | |
| *B65G 47/90* | (2006.01) | |
| *B65G 69/02* | (2006.01) | |

(52) U.S. Cl.
CPC .......... *B25J 9/1697* (2013.01); *B25J 9/1679* (2013.01); *B65D 81/052* (2013.01); *B65G 47/90* (2013.01); *B65G 69/00* (2013.01); *B65G 69/02* (2013.01)

(58) Field of Classification Search
CPC .......... B65D 8/05; B65D 8/052; B65D 81/02; B65D 81/052; B65B 23/00; B65B 1/20; B31D 5/0073; B31D 2205/00
See application file for complete search history.

(56) References Cited

U.S. PATENT DOCUMENTS

| | | | | |
|---|---|---|---|---|
| 4,793,123 A | * | 12/1988 | Pharo | B65D 81/052 53/472 |
| 4,905,835 A | * | 3/1990 | Pivert | B65D 81/052 383/3 |
| 5,907,946 A | * | 6/1999 | Oishi | G03B 42/045 414/412 |
| 5,912,058 A | * | 6/1999 | Takahashi | B65D 65/466 428/34.3 |
| 6,128,889 A | * | 10/2000 | Fuss | B65B 67/06 53/472 |
| 6,253,919 B1 | * | 7/2001 | Sperry | B65D 81/052 383/3 |

(Continued)

*Primary Examiner* — Gloria R Weeks

(57) ABSTRACT

A protection system and method for cargos in a compartment and a robotic equipment thereof, applied in the field of robotics, are disclosed. The system includes an inflatable mechanism and an airbag. The airbag is used for filling the space between the cargos and/or between the cargos and an inner wall of the compartment. The airbag includes an inlet. The inflatable mechanism is defined on a robot for inflating or deflating the airbag via the inlet. The protection system and method for cargos in a compartment and a robotic equipment thereof can improve the stability of the stacked cargos during the process of the loading and unloading of the cargos, and the stability of the cargos during transportation.

11 Claims, 9 Drawing Sheets

(56) References Cited

U.S. PATENT DOCUMENTS

| | | | | |
|---|---|---|---|---|
| 6,290,125 | B1* | 9/2001 | Breda | B65D 81/052 229/120.07 |
| 6,520,332 | B1* | 2/2003 | Barmore | B65D 71/10 206/499 |
| 6,877,533 | B2* | 4/2005 | Roskam | B65B 55/20 141/94 |
| 7,231,749 | B2* | 6/2007 | Garceau | G01M 3/36 53/507 |
| 7,254,932 | B2* | 8/2007 | Tanaka | B65B 55/20 53/139.5 |
| 7,882,954 | B2* | 2/2011 | Davlin | B65B 55/20 206/592 |
| 8,960,436 | B1* | 2/2015 | Smith | B65D 81/027 53/472 |
| 9,371,147 | B2* | 6/2016 | Straver | B65B 55/20 |
| 11,072,479 | B1* | 7/2021 | David | B65D 81/052 |
| 11,077,637 | B2* | 8/2021 | Wetsch | B31D 5/0073 |
| 11,155,351 | B2* | 10/2021 | Sopper | B64C 27/08 |
| 2003/0062286 | A1* | 4/2003 | Igarashi | B65D 81/052 383/3 |
| 2005/0178085 | A1* | 8/2005 | Huis | B31D 5/0073 53/403 |
| 2006/0108256 | A1* | 5/2006 | Bussey, III | B65D 5/606 53/472 |
| 2008/0092488 | A1* | 4/2008 | Gabrielsen | B65B 55/20 53/115 |
| 2012/0248101 | A1* | 10/2012 | Tumber | F25D 3/08 53/473 |
| 2014/0224699 | A1* | 8/2014 | Smith | B65B 5/06 206/522 |
| 2015/0291335 | A1* | 10/2015 | Wetsch | B65D 81/052 428/12 |
| 2016/0096643 | A1* | 4/2016 | Baylor | B65B 5/105 53/443 |
| 2016/0122112 | A1* | 5/2016 | Nevo | B31D 5/0073 141/4 |

\* cited by examiner

PROTECTION SYSTEM AND METHOD FOR CARGO IN A COMPARTMENT AND ROBOTIC EQUIPMENT THEREOF

CROSS REFERENCE TO RELATED APPLICATIONS

This application is a national stage filing under section 371 of International Application No. PCT/CN 2017/094666 filed on Jul. 27, 2017, which is published in Chinese on Jan. 31, 2019 as WO2019/019092, the disclosure of which are hereby incorporated by reference in their entirety.

FIELD OF THE INVENTION

The invention pertains to the field of robotics, and in particularly relates to a protection system and method for cargos in a compartment and a robotic equipment thereof.

BACKGROUND OF THE INVENTION

Rapid development of science and technology has brought about earth-shaking changes in people's lives, and at the same time has improved the efficiency of enterprises. The booming development of e-commerce has brought unprecedented efficiency requirements for domestic logistics and warehousing. At present, the more mature intelligent solution for logistics and warehousing is to realize the automatic transportation of cargo stations such as compartment or transshipment centers by setting up a large and complex system of the conveyor belts. However, for the loading and unloading of cargos, although there have been research projects using robots, there are currently no solutions that applied, and there are still performed manually. One of the reasons is that the shape of the cargos is complicated when the process of loading and unloading of cargos; thus, it is difficult to ensure that the cargos stacked in the compartment are very neat and compact and reach a very stable state, regardless of the manual or the robot. The interaction between the cargos can easily cause the instability of the stacked cargos during loading and unloading. As a result of the collapse of stacked cargos, it may cause work injury and damage to the cargos and also reduce efficiency of operation at the same time.

Therefore, how to further ensure the stability of the stacked cargos during the loading and unloading process, and during transportation are still issues to be solved.

SUMMARY OF THE INVENTION

The present invention discloses a protection system and method for cargos in a compartment and a robotic equipment thereof can improve the stability of the stacked cargos during the process of the loading and the unloading, and the stability of the cargos during transportation.

A first aspect of an embodiment of the present invention provides a protection system for cargos in a compartment. The system includes an inflatable mechanism and an airbag. The airbag is used for filling the space between the cargos and/or between the cargos and an inner wall of the compartment. The airbag includes an inlet. The inflatable mechanism is defined on a robot for inflating or deflating the airbag via the inlet.

A second aspect of an embodiment of the present invention provides a protection method for cargos in a compartment. The method includes the steps of: controlling the robot to place the cargos into the compartment and controlling an inflatable mechanism to inflate an airbag defined in the compartment when a loading task is triggered; and, controlling the inflatable mechanism to deflate the airbag and remove the cargos to be unloaded from the compartment when an unloading task is triggered.

A third aspect of an embodiment of the present invention provides a robotic equipment. The robotic equipment includes: a sensor device, a robotic arm, a processing device and a storage device, and further includes an end effector connecting to the free end of the robotic arm; wherein the storage device storing an executable code, and the processing device implementing the executable code to proceed the protection method for cargos in a compartment, which is provided by the second aspect of an embodiment of the present invention.

According to the above described embodiments of the invention, the present invention provides a protection system and method for cargos in a compartment and a robotic equipment thereof. The system includes an airbag for filling the space around the cargos and an inflatable mechanism for inflating or deflating the airbag. In one aspect, the pressing force from the surrounding objects around the cargos to the cargos is controlled within a safe rang; and, in another aspect, the damaged cargos because of the bumps in the transportation is avoided and the damage is reduced. Thus, the purpose of the invention is effectively to improve the stability of the stacked cargos during the loading and unloading tasks and during the transportation.

BRIEF DESCRIPTION OF THE DRAWINGS

The invention will be described with reference to the accompanying drawings. These and/or other aspects and advantages of the invention will become apparent and more readily appreciated from the following description of the embodiments, taken in conjunction with the accompanying drawings.

DETAILED DESCRIPTION OF THE INVENTION

The invention will be further described below in details with reference to the figures and embodiments.

Figure 1:
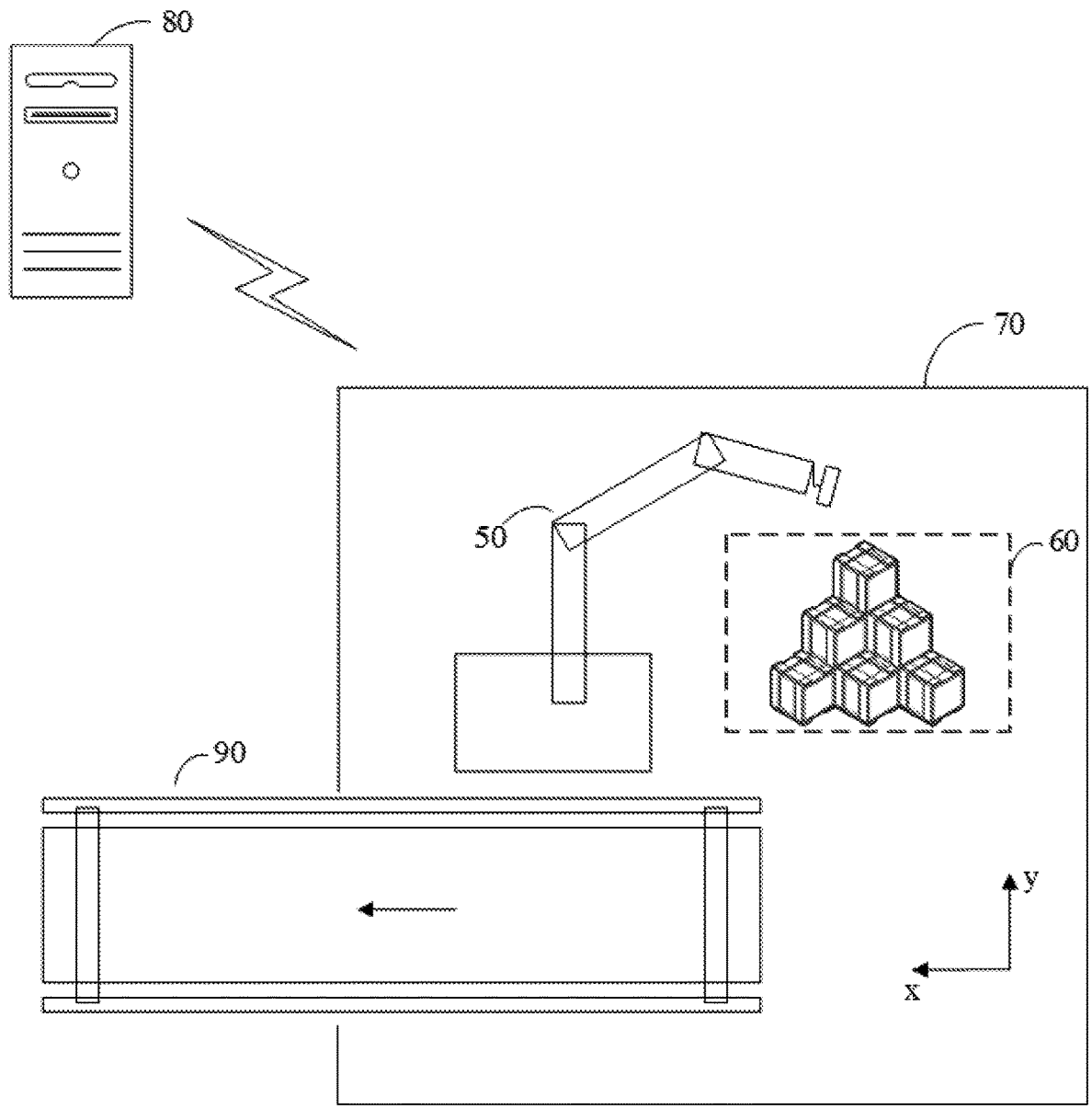
FIG. 1 is a schematic diagram of an applied environment of a protection system and method for cargos in a compartment and a robotic equipment thereof according to the present invention.

Refer to FIG. 1, FIG. 1 shows a schematic diagram of an applied environment of a protection system and method for cargos in a compartment and a robotic equipment thereof according to the present invention. As shown in FIG. 1, the robotic equipment 50 interacts with the server 80 by wired or wireless means, and proceeds to the compartment 70 to perform unloading or loading tasks according to instructions sent by server 80. For example, the cargos 60 are loaded to the compartment 70 from the outside of the compartment 70 or from the conveyor belt 90; alternatively, the cargos 60 are unloaded from the compartment 70 onto the conveyor belt 90 and transported to the outside of the compartment 70 as indicated by the arrow in FIG. 1. It is appreciated that the cargos to be unloaded can be transported to the outside of the compartment 70 by the mobile robot without the use of the conveyor belt 90. The robotic equipment 50 is a singer robot or a robots group being composed of a plurality of robots.

Figure 2:
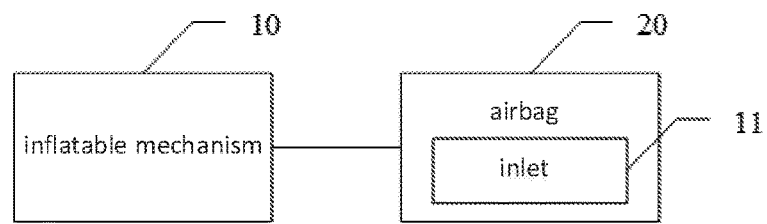
FIG. 2 is a schematic diagram of a protection system for cargos in a compartment according to one embodiment of the present invention.

Refer to FIG. 2, FIG. 2 shows a schematic diagram of a protection system for cargos in a compartment according to one embodiment of the present invention, and the protection system includes an inflatable mechanism 10 and an airbag 20.

The airbag 20 includes an inlet 11. The airbag 20 is used for filling the space between the cargos and/or between the cargos and an inner wall of the compartment. The inflatable mechanism 10 is defined on a robotic equipment—that is, the inflatable mechanism 10 is installed on the robot for unloading or loading the cargos and preferred to be installed on the arm of the robot, for inflating or deflating the airbag 20 via the inlet 11. The implementation of the inflatable mechanism 10, if needed, is only used for inflating the airbag 20, or is only for deflating the airbag 20, or both.

In the embodiment of the present invention, the inflatable mechanism is used for inflating the airbag to fill the space around the cargos. In one aspect, the pressing force from the surrounding objects around the cargos to the cargos is controlled within a safe rang; and, in another aspect, the damaged cargos because of the bumps in the transportation is avoided and the damage is reduced. Thus, the purpose of the invention is effectively to improve the stability of the stacked cargos during the loading and unloading tasks and during the transportation.

Figure 3:
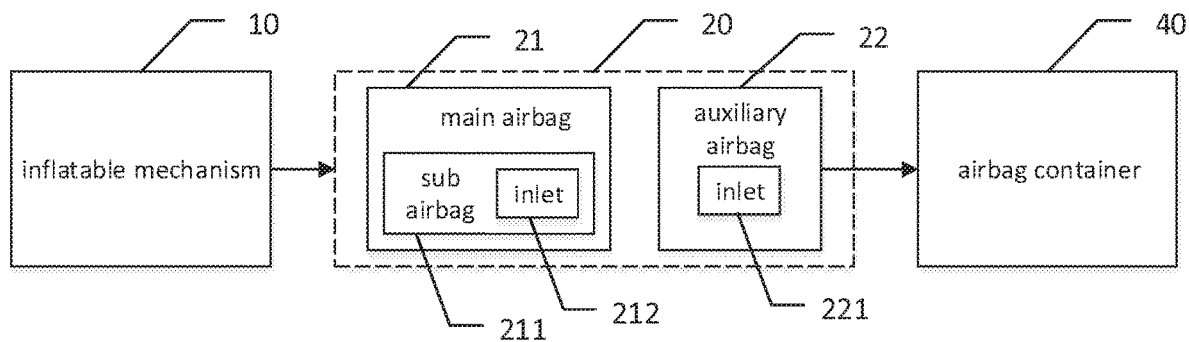
FIG. 3 is a schematic diagram of a protection system for cargos in a compartment according to another embodiment of the present invention.

In an embodiment, the airbag 20 includes a main airbag 21 disposed on the inner wall of the compartment. The compartment includes the cabin of the truck, the trailer and also a container, and it can further be transported by loading on vehicles, ships and airplanes for achieving land, sea and air transportations. Refer to FIG. 3, FIG. 3 shows a schematic diagram of a protection system for cargos in a compartment according to another embodiment of the present invention. The difference between the embodiments of the protection system for cargos in a compartment in FIG. 2 and FIG. 3 is as follows.

Furthermore, the main airbag 21 includes a plurality of sub airbags 211 with sub inlet 212, as shown in FIG. 3. The sub airbags 211 are respectively disposed in different areas of the inner wall of the compartment. Each sub airbag 211 has the independent sub inlet 212, which is individually used for inflating or deflating the corresponding sub airbag 211. The size, position and number of the sub airbags 211 are set corresponding to the area occupied by the cargos, and the size of the sub airbags 211 disposed in the opposite area may be the same or different. The different areas of the inner wall of the compartment are respectively correspond to the respective stacking areas in the compartment, that is, the location of the areas of the inner wall of the compartment are respectively related to the location of the stacking areas in the compartment.

Figure 4:
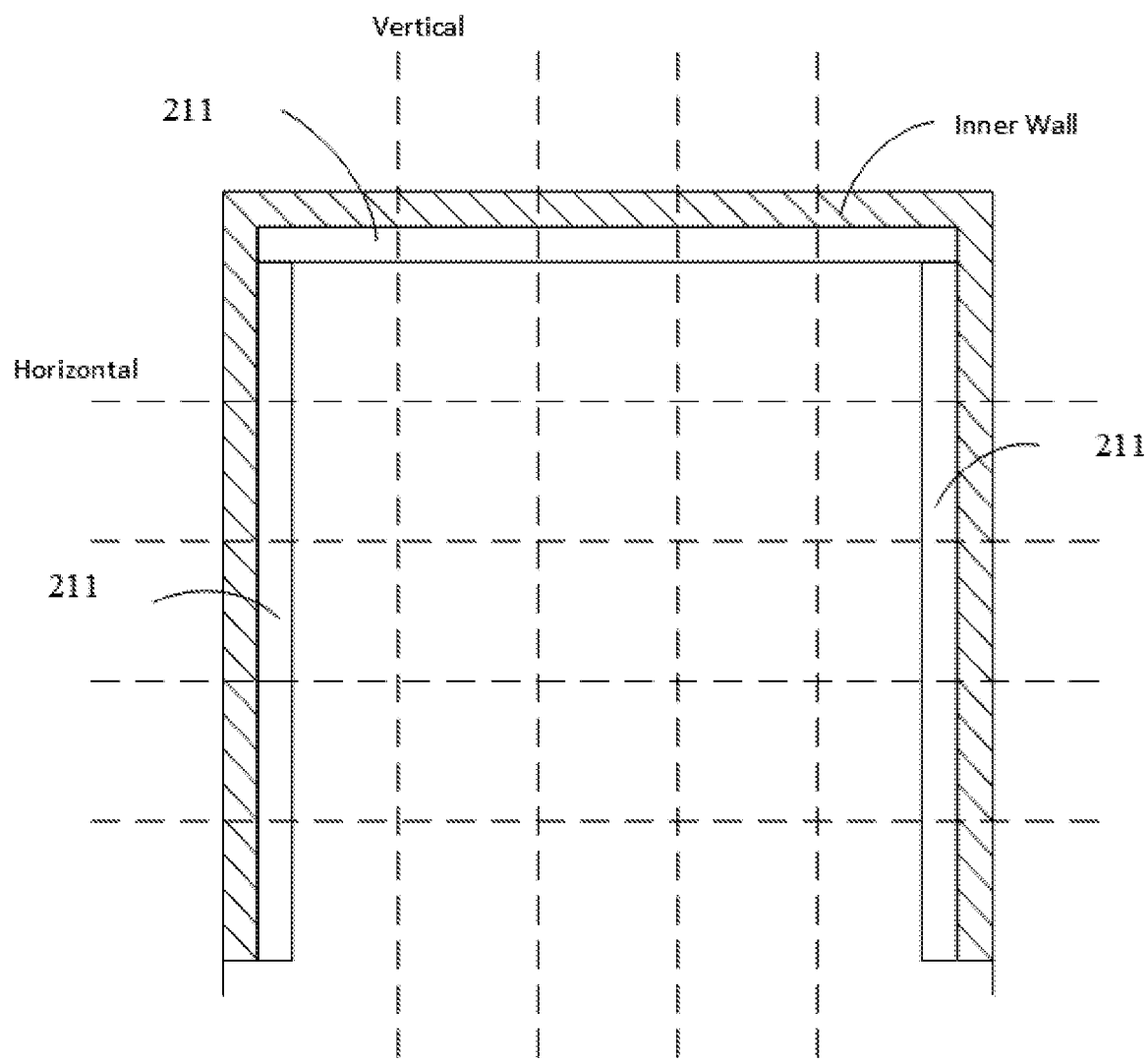
FIG. 4 is a layout of airbags of a protection system for cargos in a compartment according to one embodiment of the present invention.

In an embodiment, as shown in FIG. 4, multiple rows (horizontal or vertical) of the cargos can be placed in the compartment, and each row of the cargos consists of multiple layers of the cargos. Each row of the cargos or each layer of each row of the cargos can be placed in one stacking area. Specifically, the stacking area can be divided into rows from the inside of the compartment toward to the outside, that is, the stacking area is divided into different areas by one row and one row. It's also to classify the area based on the division by row, so the area of each row from bottom to top (i.e. from the bottom to the top of the compartment) is divided into layers and each layer of each row is used as a stacking area. It is securer for unloading the cargos to avoid the collapse of the cargos caused by the sudden deflation of the airbags 20. Specifically, the sub airbags 211 may be disposed at any one or plural positions in the left wall, the right wall, or the top wall of the inner wall in the compartment. The robotic equipment determines which sub airbags 211 to be inflated or deflated according to the actual situation of the cargos. It is appreciated that there may be multiple inflation or deflation operations for the same sub airbag in a complete workflow. For example, the corresponding sub airbags are inflated after a layer of the cargo is placed. It is found that the stacked cargos are in error after the inflation. Thus, the inflated sub airbags are deflated and then the cargos are re-arranged. The sub airbag are inflated again after the layer of the cargos are re-placed. In the process of the loading task, the inflation operation is specifically that the cargos in the last (bottom) layer are placed by the robotic equipment and then a corresponding first sub airbag is inflated. It should be noted that plural first sub airbags may be inflated, that is, a first group of sub airbags is inflated. Then, the cargos in the next layer are placed and then the corresponding second sub airbag is inflated. That is, a second group of sub airbags is inflated. And then, the cargos in another next layer are placed, and said process is repeated until all of the cargos are loaded up or the loading task of the compartment is completed. In reverse, a third sub airbag corresponding to the top layer of the cargos is firstly deflated when the unloading task is proceeded. If there are a plurality of the third sub airbags, a third group of sub airbags is deflated and then the cargos in the top layer are unloaded. Then, a fourth sub airbag corresponding to the next top layer of the cargos is deflated. If there are a plurality of the fourth sub airbags, a fourth group of sub airbags is deflated and then the cargos in the next top layer are unloaded. And then, said process is repeated until all of the cargos are unloaded or the unloading task of the compartment is completed.

Moreover, the protection system further includes a plurality of auxiliary airbags 22 with different or same specifications, as shown in FIG. 3. The auxiliary airbag 22 is used for taking the space among the cargos to make sure the stability of the stacked cargos, so the pressing force between the cargos is controlled within a safe rang. The inflatable mechanism 10 is further configured to inflate or deflate the auxiliary airbag 22 with an auxiliary inlet 221. The implementation of the inflatable mechanism 10, if needed, is only used for inflating the auxiliary airbag 22, or is only for deflating the auxiliary airbag 220, or both.

Furthermore, the protection system further includes an airbag container 40 for storing the empty auxiliary airbag 22 and/or the inflated one, and preferring to store the empty auxiliary airbag 22. It is appreciated that the airbag container 40 can contain the inflated auxiliary airbag 22 if the space of the airbag container 40 is enough.

The airbag container 40 can be defined on the robotic equipment—that is, the airbag container 40 is installed on the robot for unloading or loading the cargos so as the robot to control the use of the airbags; or the airbag container 40 can be defined on one end of a conveying device close to the robot, which is disposed at the end of conveying device and close to an end of the compartment. The cargos transported to the compartment by the conveying device are loaded up by the robotic equipment when the loading task is proceeded. The cargos to be unloaded are placed on the end of the conveying device by the robotic equipment and transported to the outside when the unloading task is proceeded. Compared to the airbag container 40 installed on the robot, it can simplify the design of the robotic equipment. And, the volume of the airbag container 40 is not limited to the size of the robotic equipment so as to accommodate more airbags. In the preferred embodiment, the airbag container 40 includes a plurality of sub containers for respectively storing the auxiliary airbag 22 of different specifications.

Furthermore, the airbag container 40 can also be a special mechanism. For example, each airbag container 40 is equipped in each compartment.

In the process of the loading task, the inflation operation is specifically that the cargos in per layer are loaded up by the robotic equipment; and then, the auxiliary airbags 22 are simultaneously inflated and according to the corresponding position filled into the gap around the stacked cargos in this layer after the inflation. Then, the cargos in the next layer are placed and then the corresponding auxiliary airbags 22 are filled into the gap. Said process is repeated until all of the cargos are loaded up. In the process of the unloading task, the auxiliary airbag 22 corresponding to the top layer of the cargos is removed and deflated, and then the cargos in the top layer are unloaded. Then, the auxiliary airbags 22 corresponding to the next top layer of the cargos are removed and deflated, and then the cargos in the next top layer are unloaded. Said process is repeated until all of the cargos are unloaded. Otherwise, the auxiliary airbags 22 are inflated and filled in the stacking area one by one by the robotic equipment when the loading task is proceeded, and the auxiliary airbags 22 are removed from the stacking area one by one when the unloading task is proceeded.

It is appreciated that the inflatable mechanism 10 only has a deflation function, or only has an inflation function, or both. For example, the inflatable mechanism includes a gas pump, a gas pipe and a gas nozzle. The gas pump is usually an electric pump, and after power is turned on, the gas pump generates a gas source to inflate the airbag connected to the gas nozzle via the gas pipe, or the power is reversed and the air in the airbag is removed. In order to save the space, the inflatable mechanism 10 may include a gas pipe and a gas nozzle. When the inflation is required, the inflatable mechanism 10 is coupled to an external inflation and/or deflation device (e.g., an gas pump), and cooperated with the external inflation and/or deflation device to inflate or deflate the airbag.

Moreover, the inflatable mechanism 10 is simplified to decrease the occupied space and the failure rate. That is, the inflatable mechanism 10 is simplified to only be provided with the inflation function for inflating the airbag; and the inlet of the airbag is opened by the robotic equipment for deflating the airbag.

It is noted that the auxiliary airbag 22 includes a characteristic information in an embodiment. The characteristic information includes a combination of any one or more of identification information, morphological information, and material characteristic information of the auxiliary airbag. The material characteristic information of the auxiliary airbag includes the texture, color and other information of the auxiliary airbag.

Furthermore, the protection system further includes a sensing device 50.

The sensing device 50 obtains a position or a pose of the auxiliary airbag 22 by identifying characteristic information of the auxiliary airbag 22, so that the robot performs deflation and recycling according to the position or the pose of the auxiliary airbag 22. Specifically, the sensing device 50 may be a visual sensing device such as a camera, or may be a signal sensing device such as an infrared detecting device. It checks where the inlet is so as to deflate and recycling according to the position or the pose of the auxiliary airbag 22. Wherein the pose can include a position and a posture.

It is selectively that the protection system further includes a first alarm device. The first alarm device is disposed in the robotic equipment or the airbag container 40 for checking if the number of the auxiliary airbag 22 stored in the airbag container 40 is less than a predetermined number or not. An alarm information is outputted if the number of the auxiliary airbag stored in the airbag container is less than the predetermined number. For example, the alarm information is sent to the server, so the other free robotic equipment is scheduled by the server to supply the airbag container 40 with the auxiliary airbag 22. Or, the alarm information is sent to the CPU of the robotic equipment, so the airbag container 40 is supplied with the auxiliary airbag 22 by the robotic equipment.

It is selectively that the protection system further includes a second alarm device. The second alarm device is used for testing if an air pressure of the auxiliary airbag is within a range of predetermined air pressure. A second alarm information is outputted if the air pressure of the auxiliary airbag is not within the range of predetermined air pressure. Specifically, the second alarm device is used for detecting if the inflation is successful or not when the main airbag 21 or the auxiliary airbag 22 is inflated by a air pressure detecting device. If it is unsuccessful, the airbag is broken, and the second alarm information is sent to the server so that the server informs staff of replacing the broken main airbag 21 or the broken auxiliary airbag 22.

In the embodiment of the present invention, the inflatable mechanism is used for inflating the airbag to fill the space around the cargos. In one aspect, the pressing force from the surrounding objects around the cargos among the cargos is controlled within a safe rang; and, in another aspect, the damaged cargos because of the bumps in the transportation is avoided and the damage is reduced. Thus, the purpose of the invention is effectively to improve the stability of the stacked cargos during the loading and unloading tasks and during the transportation.

Figure 5:
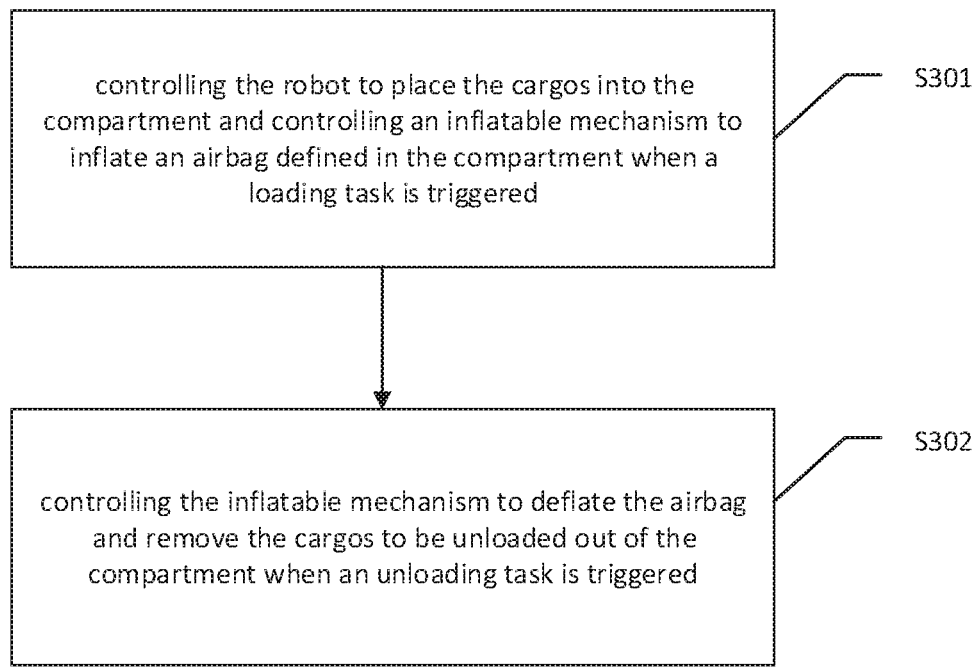
FIG. 5 is a flow of a protection method for cargos in a compartment according to one embodiment of the present invention.

Refer to FIG. 5, FIG. 5 shows a flow of a protection method for cargos in a compartment according to one embodiment of the present invention. The method is applied for the protection system for cargos in a compartment according to the embodiment of the present invention as shown in FIG. 2 or FIG. 3, which is used for making sure the completeness and the safeness of the cargos in the process of the loading/unloading tasks. The method includes the steps of:

S301: controlling the robot to place the cargos into the compartment and controlling an inflatable mechanism to inflate an airbag defined in the compartment when a loading task is triggered.

Specifically, the compartment referring to a room for storing the cargos during transportation includes, but is not limited to, the cabin of the car, the hold of the ship, the bay of the plane, the container, etc. The loading task can be trigger based on the occurrence, but is not limited to: receiving a dispatching instruction sent by the server to indicate loading, reaching the preset time of the loading task and detecting that all of the cargos to be unloaded in the compartment are completely took out when the re-loading task is proceeded.

Taking receiving a dispatching instruction sent by the server to indicate loading as an example, the server determines the schedulable robot based on preset loading plan or the current location of the vehicle to be loaded and the activity information of each robot when receiving the notification of the delivery vehicle reaching the preset location of the loading area, and sends a scheduling instruction to the determined robot to load the cargos. The robot proceeds to the location of the vehicle to be loaded pointed to by the scheduling instruction in response to the scheduling instruction and enters into the compartment. Firstly, the robot performs stacking the cargos and then controls the inflatable mechanism to inflate the airbag disposed between the inner wall of the compartment and the cargos and/or between the cargos, so that in the process of loading the cargos, the pressing force from the hard inner wall of the compartment can be buffered, thereby protecting the cargos from being crushed when the robot pushes the cargos to the inner wall of the compartment. The robot can inflate the airbags once after loading all of the cargos up, or can perform stacking and inflation one area after another based on every stacking area.

Taking reaching the preset time of the loading task as an example, when the robot receives the scheduled instruction for loading the cargos, the robot begins the countdown to the preset time of the loading task indicated by the scheduled instruction for loading the cargos; as the countdown is ended, the robot proceeds to the assigned compartment according to the scheduled instruction, and then loads the cargos and inflate the airbags.

Taking detecting that all of the cargos to be unloaded in the compartment are completely took out when the re-loading task is proceeded, as an example. If the robot receives the re-loading command sent by the server during the process of loading the cargos, the cargos according to the re-loading command are unloaded by the robot; or, the wrong loaded cargos are unloaded when there is error detected by the robot. Then, the unloaded cargos are re-loaded and the airbags are inflated if detecting that the cargos to be unloaded are took out.

It is selectively that the airbag includes a plurality of sub airbags with sub inlets. The sub airbags are respectively disposed in different areas of an inner wall of the compartment, the different areas of the inner wall of the compartment respectively correspond to the respective stacking areas in the compartment. Each row of the cargos or each layer of each row of the cargos preferably can be placed in one stacking area. Multiple rows of the cargos can be placed in the compartment, and each row of the cargos consists of multiple layers of the cargos.

Figure 6:
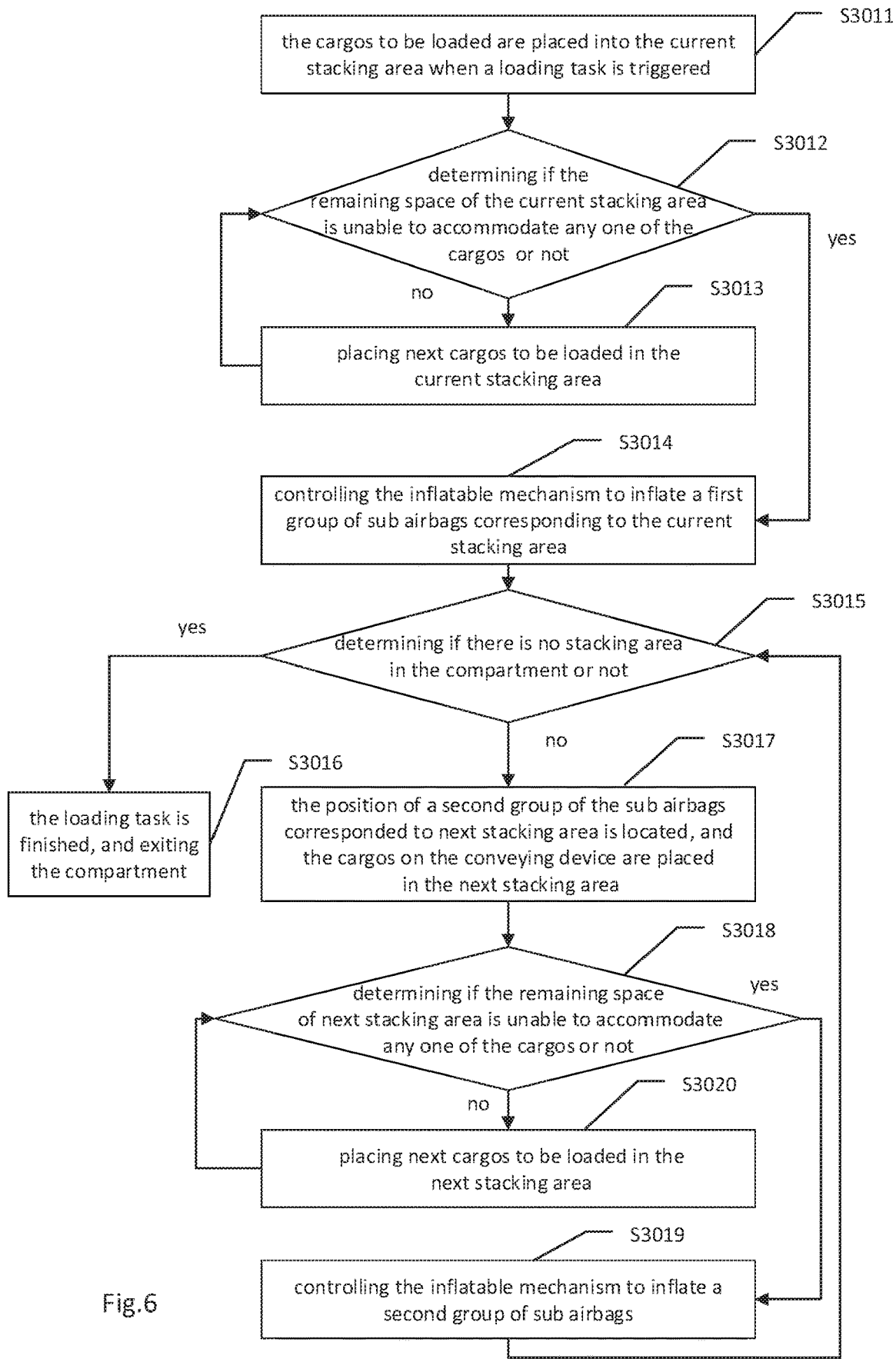
FIG. 6 is an implemented flow of the step S301 of a protection method for cargos in a compartment according to one embodiment of the present invention.

In the preferred embodiment, the step S301 is implemented by the steps S3011-S3020 as follow, as shown in FIG. 6.

S3011: the cargos to be loaded are placed into the current stacking area when a loading task is triggered.

When the loading task is triggered, the holding position or the holding pose of the cargos to be loaded is calculated by the robot according to the space data of the current stacking area and the volume and the weight of the cargos to be loaded, which are sent by the camera device. Then, the motion track of the robot from the current position or the current pose to the holding position or the holding pose is calculated to proceed for holding the cargos. Furthermore, another motion track is obtained based on the target placing position or the target placing pose, and the position or the pose of the current holding cargos. Then, the robot is controlled to proceed to the target placing position or the target pacing pose for placing the cargos via an end effector of the robotic arm. Wherein the camera device includes the camera disposed in the robotic arm and/or the compartment.

S3012: determining if the remaining space of the current stacking area is unable to accommodate any one of the cargos or not.

Each stacking area is not limited to be placed one cargo. According to the remaining space of the current stacking area and the volume and the weight of the cargos to be loaded, which are sent by the camera device, the robot determines if the remaining space of the current stacking area is still able to accommodate any one of the cargos or not.

If there is the remaining space to accommodate the cargos, proceed the step S3013: placing next cargos to be loaded in the current stacking area. Then, proceed to the step S3012.

If there is no any remaining space to accommodate the cargos, proceed the step S3014: controlling the inflatable mechanism to inflate a first group of sub airbags corresponding to the current stacking area.

Figure 7:
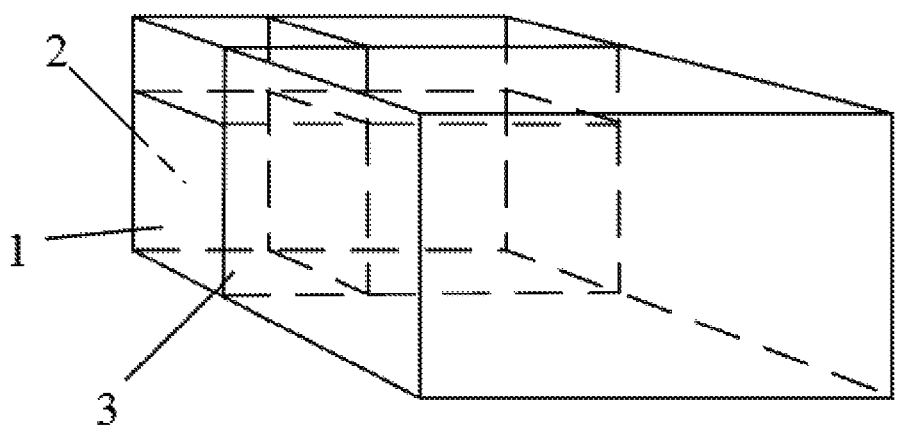
FIG. 7 is a layout of airbags of a protection method for cargos in a compartment according to one embodiment of the present invention.

It is appreciated that each stacking area is not limited to be placed only one cargo. According to the remaining space of the current stacking area and the volume of the cargos, and further the weight of the cargos to be loaded, which are sent by the camera device, the robot determines if the remaining space of the current stacking area is able to accommodate any one of the cargos or not. If not, the inflatable mechanism is controlled to inflate the first group of sub airbags corresponding to the current stacking area. It is appreciated that each stacking area is corresponding to at least one sub airbag. For example, when the stacking area is located in the lower left corner of the compartment as shown in FIG. 7, the stacking area is corresponding to: the first group of sub airbags, which is composed of the sub airbags 1 and 2 respectively placed at two side walls adjacent to the lower left corner of the compartment, and the sub airbag 3 placed on the bottom of the lower left corner of the compartment.

The position of each sub airbag is located by the robot via a location coordinate of each group of the sub airbags sent by an infrared sensor, a visual sensor or the server.

S3015: determining if there is no stacking area in the compartment or not.

If there is no stacking area in the compartment, proceed to the step S3016: the loading task is finished, and the robot exits the compartment. The notifications of the termination of the loading task and the reason for the termination are further sent by the server.

If there is still the stacking area in the compartment, proceed to the S3017: the position of a second group of the sub airbags corresponded to next stacking area is located, and the cargos on the conveying device are placed in the next stacking area.

It is selectively that further determining all of the cargos to be loaded are loaded up when there is still the stacking area in the compartment. If all of the cargos are loaded up, proceed to the step S3016. If there are still other cargos to be loaded, proceed to the step S3017. For determining all of the cargos to be loaded are loaded up, it can be realized by judging whether there is still any cargos on the conveyor belt, or judging whether the notifications of the termination of the loading task is received. If there is no cargos on the conveyor belt or the notifications of the termination of the loading task is received, it is confirmed that all of the cargos to be loaded are loaded up.

S3018: determining if the remaining space of next stacking area is unable to accommodate any one of the cargos or not.

If there is no any space to accommodate the cargos, proceed the step S3019: controlling the inflatable mechanism to inflate a second group of sub airbags.

If there is space to accommodate the cargos, proceed the step S3020: placing next cargos to be loaded in the next stacking area. Then, proceed to the step S3018.

The implementation process of the steps S3017-S3020 is similar to the steps S3011-S3014, and details are not described herein.

S302: controlling the inflatable mechanism to deflate the airbag and removing the cargos to be unloaded from the compartment when an unloading task is triggered.

The unloading task can be trigger based on the following occurrence, but is not limited to: receiving a dispatch sent by the server to indicate unloading or re-loading, and detecting that there is wrong cargos are loaded.

Removing the cargos to be unloaded from the compartment can includes: the cargo is transferred out from the compartment by one or more robots with a moving chassis cooperated with each other, or by a transport mechanism cooperated with the robot, wherein the transport mechanism includes the mobile robot and/or the conveyor belt. The cargo is unloaded to the mobile robot or to conveyor belt by the robot, and also can be unloaded to the mobile robot by the robot and then be transferred to the conveyor belt by the mobile robot. The mobile robot includes said robot with the moving chassis, and also a loading device such as any movable robot in combination with the moving chassis. It can be understood that the cargos are all unloaded and transferred by several fixed robots cooperated with each other.

In the process of the cargos being unloaded from the compartment, the airbags disposed at the space between the cargos and/or between the cargos and the inner wall of the compartment are firstly deflated by the robot, and the cargos are removed from the compartment.

Figure 8:
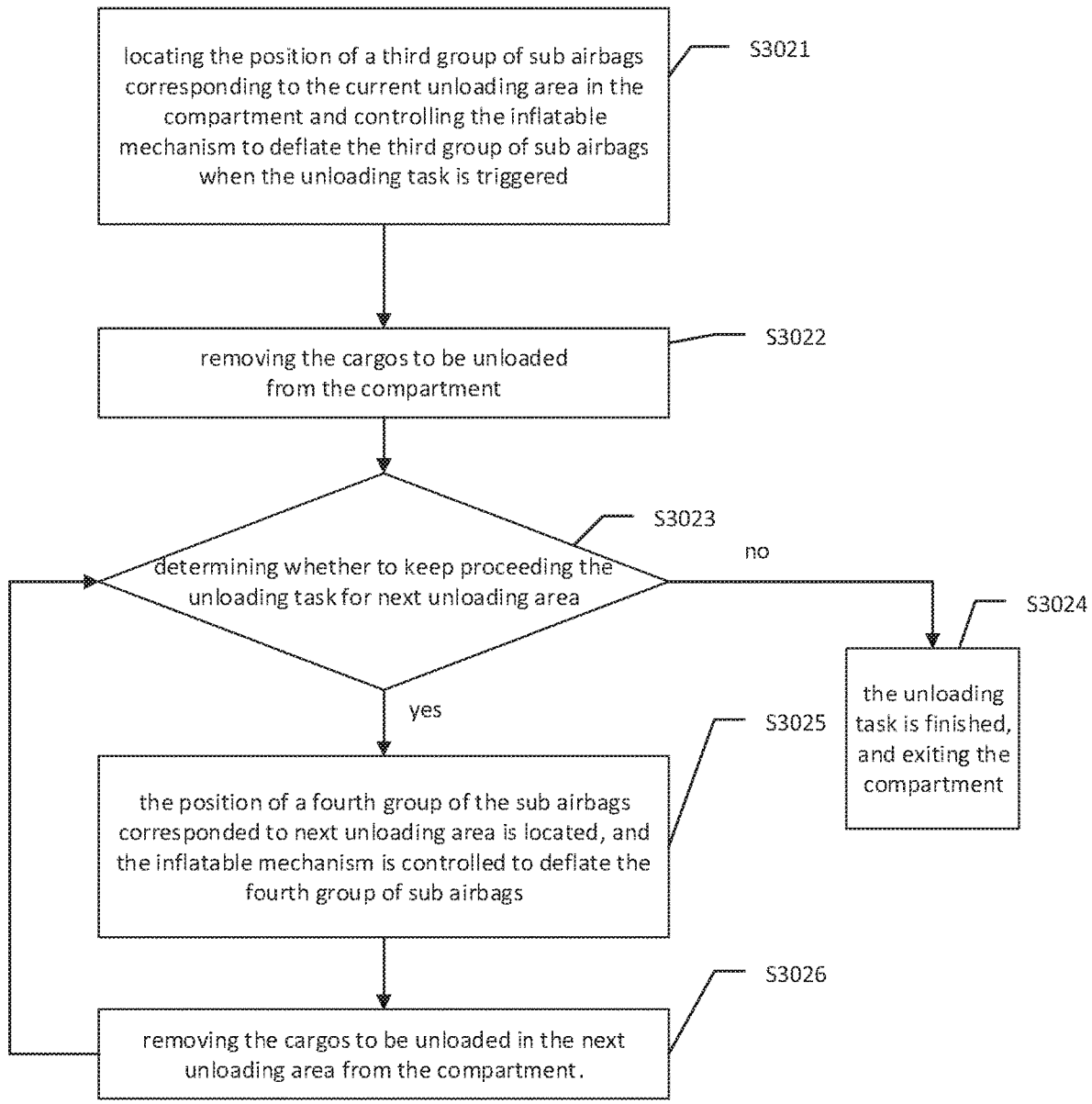
FIG. 8 is an implemented flow of the step S302 of a protection method for cargos in a compartment according to one embodiment of the present invention.

In the preferred embodiment as shown in FIG. 8, the step S302 is implemented by the steps S3021-S3026.

S3021: locating the position of a third group of sub airbags corresponding to the current unloading area in the compartment and controlling the inflatable mechanism to deflate the third group of sub airbags when the unloading task is triggered.

The current unloading area can be placed one or more cargos. The position of each sub airbag is located by the robot via a location coordinate of each group of the sub airbags sent by an infrared sensor, a visual sensor or the server when the unloading task is triggered. The current unloading area is checked according to the space data of the compartment and the preset unloading area such as length, width and height, which are sent by the camera device. The space data of the compartment includes, but is not limited to, the spatial parameters of the compartment (e.g. length, width and height) and the location coordinate of the cargos stacked in the compartment. Generally, the current unloading area may be, for example, the top area closest to the two sides of the door of the compartment.

S3022: removing the cargos to be unloaded from the compartment.

The motion track of the robot from the current position or the current pose to the holding position or the holding pose is calculated by the robot according to the space data of the current unloading area, the attribute data of the cargos to be unloaded, the position or the pose of the cargos to be unloaded and the current position or the current pose of the robotic arm of the robot. The attribute data of the cargos to be unloaded is not limited to the volume, type and weight. The stacking way of the cargos is obtained by the attribute data. It can be appreciated that the motion track includes the motion track of the moving chassis and the motion track of the end effector of the robotic arm, which are obtained according to the end effector of the robotic arm reaching the position or the pose for holding the cargos to be unloaded in the implementation of the robot with the moving chassis. For example, the position in the compartment, which is the moving chassis should move to, is calculated according to the pose of the end effector holding the cargos to be unloaded, and the end effector of the robotic arm reaching position or the pose for holding the cargos to be unloaded is provided. The rotation data of the joint angles of the robotic arm is obtained according to the end effector reaching position or the pose for holding the cargos to be unloaded, to implement the final position or the pose for the end effector holding the cargos to be unloaded. Based on the motion track, the robot make the end effector can reach the position or the pose for holding the cargos to be unloaded, hold the cargos to be unloaded, and remove the cargos to be unloaded from the compartment. Particularly, the step of removing the cargos from the compartment may include transferring the holding cargos to be unloaded to a target position. The target position may be a position of the conveyor belt near the end of the compartment, or may be a position of the space outside the compartment for storing the cargos to be unloaded. The space data of the unloading area, but is not limited to the position data of the cargos to be unloaded, which is placed in the unloading area, can be sent by the camera.

S3023: determining whether it is necessary to keep proceeding the unloading task for next unloading area.

Particularly, whether it is necessary to keep proceeding the unloading task for next unloading area is determined by judging whether there is any cargos in the next unloading area according to the space data of the compartment sent by the camera. If there is any cargos in the next unloading area, continuing the unloading task for next unloading area is determined. Otherwise, not continuing the unloading task for next unloading area is determined if receiving the notifications of the termination of the unloading task. After the cargos to be unloaded in the unloading area are removed from the compartment, continuing the unloading task for next unloading area is determined if not receiving the notification of the termination of the unloading task.

If the unloading task for next unloading area is not continued, proceed to the step S3024: the unloading task is finished, and the robot exits the compartment. Furthermore, the notifications of the termination of the unloading task and the reason for the termination can be sent by the server. If the unloading task for next unloading area is continued, proceed to the step S3025: the position of a fourth group of the sub airbags corresponded to next unloading area is located, and the inflatable mechanism is controlled to deflate the fourth group of sub airbags.

Specifically, the next unloading area is determined by the robot according to the space data of the compartment sent by the camera. Generally, the next unloading area may be, for example, the unloading area closest to the area where the cargos to be unloaded are recently unloaded.

S3026: removing the cargos to be unloaded in the next unloading area from the compartment. Then, proceed to the step S3023 until all of the cargos to be unloaded are removed from the compartment, or when the notification of the termination of the unloading task is received.

It should be noted that FIG. 5 only shows an embodiment of an applied scenario. In a real application, steps 301 and 302 are not executed in sequence according to the specific applied scenario, and the sequence of the steps is specifically determined by the type of the triggered task. If the triggered task is a loading task, proceed to the step 301. If the triggered task is an unloading task, proceed to the step 302. If the triggered task includes the loading task and also includes the unloading task, the sequence of the steps S301 and S302 is confirmed according to the order of triggered time of the specific task, or the preset execution order, or the level of the triggered task. For example, the task which is triggered firstly is first executed, the task which is triggered lately is later executed, the high level of the task is first executed, and the low level of the task is later executed, etc.

In the embodiment of the present invention, the inflatable mechanism is used for inflating the airbag to fill the space around the cargos in the process of loading the cargos. In one aspect, the cargos are stacked stably; and, in another aspect, the bumps in the transportation will be not enough to cause the cargos damage and the damage cargos are reduced. Thus, the purpose of the invention is effectively to improve the stability of the stacked cargos during the loading and unloading tasks and during the transportation.

Figure 9:
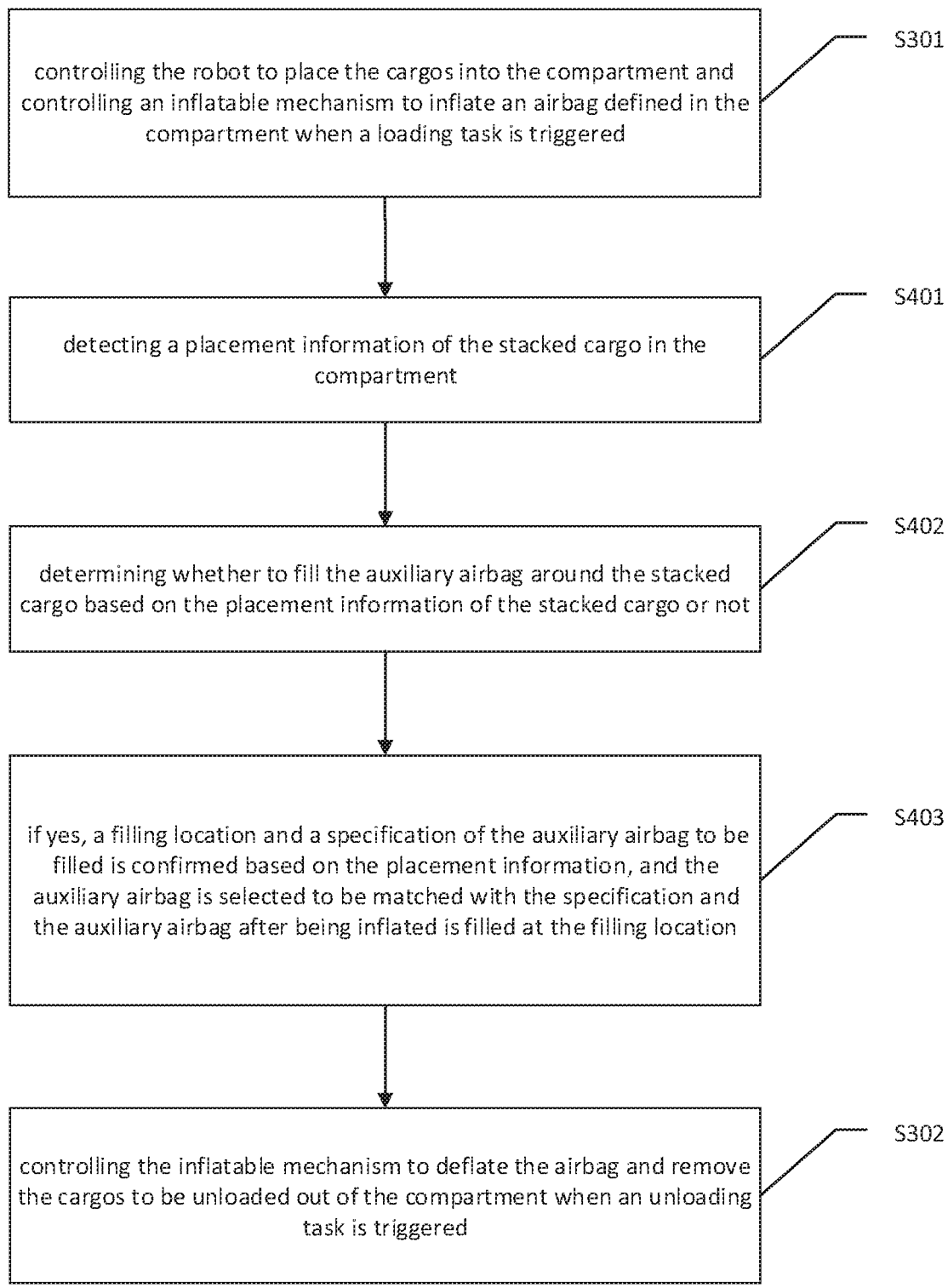
FIG. 9 is a flow of a protection method for cargos in a compartment according to another embodiment of the present invention.

Refer to FIG. 9, FIG. 9 shows a flow of a protection method for cargos in a compartment according to another embodiment of the present invention, which is different from the protection method for cargos in a compartment as shown in FIG. 5. In this embodiment as shown in FIG. 9, furthermore, the auxiliary airbag is used for taking the space among the cargos to make sure the stability of the stacked cargos, and also make the pressing force from the surrounding objects around the cargos among the stacked cargos is released. Specifically, the following steps are further included after the step S301.

S401: detecting a placement information of the stacked cargo in the compartment.

The placement information may include, but is not limited to, a fragility level of the stacked cargos, a gap size between the stacked cargo and a surrounding object and a gap location between the stacked cargos and the surrounding object.

The fragility level may be set at multiple levels, for example, a first fragility level, a second fragility level, a third fragility level, a fourth fragility level, etc. The higher the fragility level is, the less fragile the cargos are.

The surrounding object includes other cargos, and also the walls of the compartment or the object that can form a compressive relationship with the cargos. The gap includes any gaps between the stacked cargos and the surrounding object in front, back, up, down, left and right.

S402: determining whether to fill the auxiliary airbag around the stacked cargo based on the placement information of the stacked cargo or not.

It is selectively that the placement information of the stacked cargo includes a fragility level of the stacked cargos or a gap size between the stacked cargos and a surrounding object. It is confirmed that the auxiliary airbag is unnecessary to be filled between the cargo and the surrounding object, if the gap size is less than a predetermined value, or if the fragility level goes to a predetermined sturdy level. It is confirmed that the auxiliary airbag is necessary to be filled between the cargo and the surrounding object if the gap is greater than the predetermined value or if the fragility level goes to a predetermined fragile level.

S403: if yes, a filling location and a specification of the auxiliary airbag to be filled is confirmed based on the placement information, and the auxiliary airbag is selected to be matched with the specification and the auxiliary airbag after being inflated is filled at the filling location.

It is selectively that the placement information further includes a gap location between the stacked cargos and the surrounding object. Specifically, the filling location, the material and the size of the auxiliary airbag to be filled are confirmed based on the gap location and the gap size between the stacked cargos and the surrounding object.

Furthermore, a recycling sequence of the auxiliary airbag is confirmed based on the placement information of the stacked cargos when the step S302 is executed, that is, the unloading task is processed. According to the confirmed recycling sequence, the auxiliary airbag is caught to put into an airbag container, or put into the airbag container after the inflatable mechanism deflating the auxiliary airbag.

It is selectively that a position or a pose of the auxiliary airbag is obtained by the sensing device identifying characteristic information of the auxiliary airbag, so that the robot performs deflation and recycling according to the position or the pose of the auxiliary airbag. Wherein the characteristic information includes, but is not limited to, a combination of any one or more of identification information, morphological information, and material characteristic information of the auxiliary airbag. Specifically, the sensing device may be a visual sensing device such as a camera, or may be a signal sensing device such as an infrared detecting device. It checks where the inlet is so as to deflate and recycling according to the pose of the auxiliary airbag.

Furthermore, it is checked if the number of the auxiliary airbag stored in the airbag container is less than a predetermined number or not, regularly, or as soon as the auxiliary airbag is caught to be inflated by the robot. If the number of the auxiliary airbag stored in the airbag container is less than the predetermined number, a first alarm information is outputted to the server; or the robot moves to the supplement location of the auxiliary airbags and catches the new auxiliary airbag, according to the preset supplement location of the auxiliary airbags or the supplement location of the auxiliary airbags being obtained by the server.

Furthermore, it is tested if an air pressure of the auxiliary airbag is within a range of predetermined air pressure, regularly, or in the process of the airbag being inflated. A second alarm information is outputted to the server if it is not within the range of predetermined air pressure, so the stuff is informed by the server to replace the broken airbag, whose internal air pressure is outside the range of predetermined air pressure.

In the embodiment of the present invention, it is further determined whether to fill the auxiliary airbag around the stacked cargos based on the placement information of the stacked cargo or not, to stable the stacked cargos and also to release the pressing force from the surrounding objects around the cargos. If yes, the filling location and the specification of the auxiliary airbag to be filled is confirmed based on the placement information, and the matched auxiliary airbag is selected to be placed at the filling location after being inflated, so as to improve the stability of the stacked cargos during the loading and unloading tasks and during the transportation.

Figure 10:
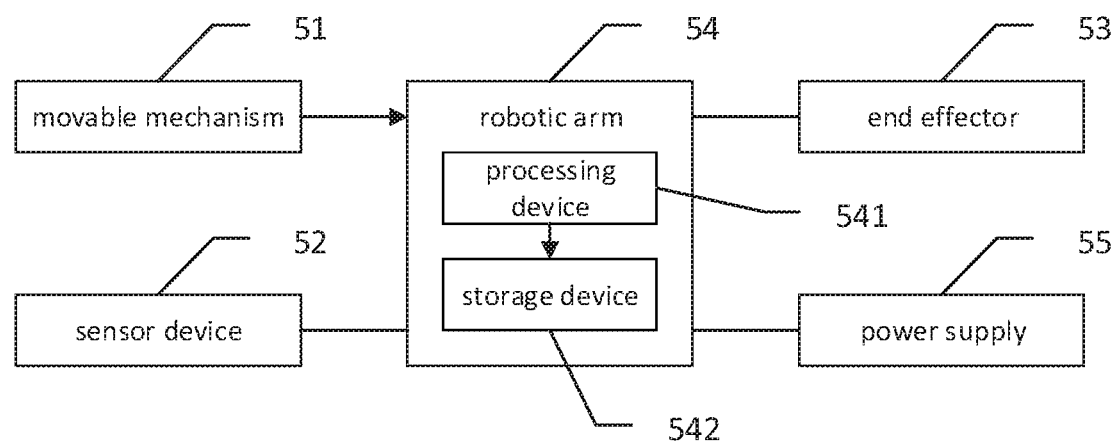
FIG. 10 is a schematic diagram of a robotic equipment for controlling the robot to place the cargos according to one embodiment of the present invention.

Please refer to FIG. 10, FIG. 10 shows a schematic diagram of a robotic equipment according to one embodiment of the present invention, which can implement the method for controlling the robot to place the cargos in the above embodiment.

The robotic equipment 50 in the present invention includes a sensor device 52, an end effector 53, a robotic arm 54 and a power supply 55.

The sensor device 52 can include, but not is limited to, a force and torque sensor, a visual sensing device such as a camera, an infrared detecting device, a proximity sensor, a vacuum sensor, etc.

The robotic arm 54 can be a tandem robotic arm with 6 degrees of freedom, and its free end is connected to the end effector 53. The end effector 53 includes a suction cup, a robotic hand, a clamping tool, etc. for catching the cargos on the conveyor belt.

The robotic equipment 50 includes at least one processing device 541 and a storage device 542. The processing device 541 is such as CPU. The processing device 541 and the storage device 542 are disposed on the robotic arm 54, or can be disposed on a special placement mechanism, which is connected to the robotic arm 54. The electrically connections between said processing device 541, the storage device 542, the sensor device, the end effector 53, the robotic arm 54 and the power supply 55 can be implemented by communication, such as by a bus connection.

The robotic equipment 50 further includes a movable mechanism 51, which including said moving chassis. The end of the robotic arm 54, opposed to the free end thereof is connected to the movable mechanism 51. The movable mechanism 51 can be disposed a plurality of wheels on the bottom to achieve mobility, and further can include a driving assembly to make the wheels turn on, such that the robotic equipment 50 has the ability of actively move.

Among that, the storage device 542 can be a random access memory (RAM), or can be a non-volatile memory such as magnetic disk storage. The storage device 542 is used for storing an executable code, and the processing device 541 is coupled to the storage device 542. Said processing device 541 is configured to call the executable code stored in the storage device 542 and performs the following operations:

The executable code stored in the storage device 542 is implemented by the processing device 541 to proceed the protection method for cargos in a compartment according to the embodiments shown in FIG. 5 to FIG. 9.

The functional modules in various embodiments of the present invention may be integrated into one processing module; or, each functional module may exist physically separately; or, two or more functional modules may be integrated into one processing module. The above integrated modules can be implemented by the functional modules in the form of hardware or in the form of software.

The above integrated modules, if implemented in the form of software functional modules and sold or used as separate products, may be stored in a computer readable storage medium. It is understood that the technical solution of the present invention may contribute to the prior art, or all or part of the technical solution may be embodied in the form of a software product. The computer software product is stored in the storage medium and includes instructions for making a computer device (which may be a personal computer, a robotic device, a server, or a network device, etc.) perform all or part of the methods according to the various embodiments of the present invention. The foregoing storage medium includes a U disk, a mobile hard disk, a Read-Only Memory (ROM), a Random Access Memory (RAM), a magnetic disk or an optical disk, and any medium which can store the executable code.

It should be noted that, for the sake of brevity, the foregoing method in various embodiments are all described as a series of action combinations. However, a person skilled in the art should understand that the present invention is not limited by the described sequence of the action, because certain steps may be performed in other sequences or concurrently in accordance with the present invention. In the following, a person skilled in the art should also understand that the embodiments described in the specification are all preferred embodiments, and the actions and modules involved are not necessarily required by the present invention.

In the above embodiments, the descriptions of the various embodiments are all focused, and the parts that are not detailed in a certain embodiment can be referred to the related descriptions of other embodiments.

A protection system and method for cargos in a compartment and a robotic equipment thereof are provided by the present invention and are describe as above. For a person skilled in the art, there will be changes in specific implemented modes and applied scopes according to the idea of the embodiment of the present invention. In summary, the content of the specification should not be construed as limiting the invention.

What is claimed is:

1. A protection method for cargos in a compartment, the method comprising the steps of:
controlling a robot to place the cargos into the compartment and controlling an inflatable mechanism to inflate an airbag defined in the compartment when a loading task is triggered; and,
controlling the inflatable mechanism to deflate the airbag and removing the cargos to be unloaded from the compartment when an unloading task is triggered.

2. The method according to claim 1, wherein the airbag comprises a plurality of sub airbags, the sub airbag has a sub inlet, the sub airbags are respectively disposed in different areas of an inner wall of the compartment, the different areas of the inner wall of the compartment correspond to the respective stacking areas in the compartment.

3. The method according to claim 1, wherein the step of controlling the robot to place the cargos into the compartment and controlling the inflatable mechanism to inflate the airbag defined in the compartment when the loading task is triggered, comprising the steps of:
placing the cargos to be loaded in the current stacking area when the loading task is triggered;
controlling the inflatable mechanism to inflate a first group of sub airbags corresponding to the current stacking area when the remaining space of the current stacking area is unable to accommodate any one of the cargos;

locating a second group of sub airbags corresponding to the next stacking area, and placing the cargos on the conveyor belt into the next stacking area; and, controlling the inflatable mechanism to inflate the second group of sub airbags when the remaining space of the next stacking area is unable to accommodate any one of the cargos.

4. The method according to claim 1, wherein the step of controlling the inflatable mechanism to deflate the airbag and remove the cargos to be unloaded from the compartment when the unloading task is triggered, comprising the steps of:

locating a third group of the sub airbags corresponding to a current unloading area when the unloading task is triggered;

removing the cargos to be unloaded from the compartment;

locating a fourth group of sub airbags corresponding to the next unloading area, and controlling the inflatable mechanism to deflate the fourth group of sub airbags; and, removing the cargos in the next unloading area from the compartment.

5. The method according to claim 1, wherein the airbag comprises an auxiliary airbag, the method further comprising the steps:

detecting a placement information of the stacked cargos in the compartment;

determining whether to fill the auxiliary airbag around the stacked cargos based on the placement information of the stacked cargos or not; and, confirming a filling location and a specification of the auxiliary airbag to be filled based on the placement information if yes, and selecting the auxiliary airbag to be matched with the specification, and filling the auxiliary airbag, which is after being inflated, to the filling location.

6. The method according to claim 5, wherein the placement information of the stacked cargos comprises a fragility level of the stacked cargos or a gap size between the stacked cargos and a surrounding object, and the step of determining whether to fill the auxiliary airbag around the stacked cargos based on the placement information of the stacked cargos or not comprises the steps of:

not filling the auxiliary airbag in between the cargo and the surrounding object if the gap size is less than a predetermined value or if the fragility level goes to a predetermined sturdy level; and, filling the auxiliary airbag in between the cargo and the surrounding object if the gap size is greater than the predetermined value or if the fragility level goes to a predetermined fragile level.

7. The method according to claim 5, wherein the placement information further comprises: a gap location between the stacked cargos and a surrounding object, and the step of confirming the filling location and the specification of the auxiliary airbag to be filled based on the placement information comprises the steps of:

confirming the filling location, the material and the size of the auxiliary airbag based on the gap location and a gap size between the stacked cargos and the surrounding object.

8. The method according to claim 1, further comprises the steps of:

confirming a recycling sequence of the auxiliary airbag based on a placement information of the stacked cargos when the unloading task is processed; and according to the confirmed recycling sequence, catching the auxiliary airbag to put into an airbag container, or putting the auxiliary airbag into the airbag container after the inflatable mechanism deflating the auxiliary airbag.

9. The method according to claim 8, further comprises the steps of:

checking if the number of the auxiliary airbag stored in the airbag container is less than a predetermined number or not; and, outputting a first alarm information if the number of the auxiliary airbag stored in the airbag container is less than the predetermined number.

10. The method according to claim 1, further comprises the steps of:

testing if an air pressure of the auxiliary airbag is within a range of predetermined air pressure, regularly, or when the process of inflating; and, outputting a second alarm information if the air pressure of the auxiliary airbag is not within the range of predetermined air pressure.

11. A robotic equipment, comprising: a sensor device, a robotic arm, a processing device and a storage device, and further comprising an end effector connecting to the free end of the robotic arm;

wherein an executable code is stored in the storage device, and the processing device implementing the executable code to proceed the protection method for cargos in a compartment according to claim 1.

* * * * *